US008309158B2

(12) United States Patent
Barnekow et al.

(10) Patent No.: US 8,309,158 B2
(45) Date of Patent: Nov. 13, 2012

(54) COMPOSITION FOR REDUCING THE NACL CONTENT IN FOOD PRODUCTS

(75) Inventors: Sylvia Barnekow, Marienmünster (DE); Rainer Barnekow, Marienmünster (DE); Christopher Sabater-Lüntzel, Holzminden (DE)

(73) Assignee: Symrise AG, Holzminden (DE)

( * ) Notice: Subject to any disclaimer, the term of this patent is extended or adjusted under 35 U.S.C. 154(b) by 448 days.

(21) Appl. No.: 12/507,365

(22) Filed: Jul. 22, 2009

(65) Prior Publication Data

US 2010/0028496 A1 Feb. 4, 2010

Related U.S. Application Data

(60) Provisional application No. 61/084,818, filed on Jul. 30, 2008.

(51) Int. Cl.
*A23L 1/304* (2006.01)

(52) U.S. Cl. .............. 426/649; 426/74; 426/94; 426/98; 426/99; 426/285

(58) Field of Classification Search .................... 426/74, 426/94, 98, 99, 615, 285, 649
See application file for complete search history.

(56) References Cited

U.S. PATENT DOCUMENTS

| | | | | |
|---|---|---|---|---|
| 3,271,166 | A * | 9/1966 | Van Leeuwen et al. | 426/613 |
| 4,375,483 | A * | 3/1983 | Shuford et al. | 426/330.6 |
| 4,385,076 | A | 5/1983 | Crosby | |
| 4,536,418 | A * | 8/1985 | Goldsmith | 427/213 |
| 4,556,566 | A | 12/1985 | Bell | |
| 5,094,862 | A | 3/1992 | Bunick et al. | |
| 5,098,723 | A | 3/1992 | DuBois et al. | |
| 5,260,091 | A | 11/1993 | Locke et al. | |
| 6,056,949 | A * | 5/2000 | Menzi et al. | 424/76.1 |
| 6,139,887 | A | 10/2000 | Carment et al. | |
| 6,541,050 | B1 | 4/2003 | Bonorden et al. | |
| 2008/0031999 | A1 * | 2/2008 | Marcussen et al. | 426/2 |
| 2008/0085360 | A1 * | 4/2008 | Chigurupati | 426/649 |

FOREIGN PATENT DOCUMENTS

| | | | |
|---|---|---|---|
| EP | 0 331 425 | A2 | 9/1989 |
| EP | 1 258 200 | A2 | 11/2002 |
| JP | 11155523 | A | 6/1999 |
| WO | WO-2004/078302 | A1 | 9/2004 |
| WO | WO-2005/096841 | A1 | 10/2005 |
| WO | WO-2006/024587 | A1 | 3/2006 |
| WO | WO-2006/058893 | A2 | 6/2006 |
| WO | WO-2006/106023 | A1 | 10/2006 |
| WO | WO-2007/003527 | A1 | 1/2007 |
| WO | WO-2007/045566 | A1 | 4/2007 |
| WO | WO-2008/046895 | A1 | 4/2008 |

OTHER PUBLICATIONS

Extended European Search Report, EP Application No. 09166041.5, dated Oct. 12, 2009.

N. Murray, "Reduction on the Increase," Food Processing, May 2004, pp. 21-22.

R.S.J. Keast, et al., "Suppression of Bitterness Using Sodium Salts," Chimia, 55, No. 5, 2001, pp. 441-447.

M. Ruusunen, et al., "Reducing sodium intake from meat products," Meat Science 2005, 70 (Book 3), pp. 531-541.

* cited by examiner

*Primary Examiner* — Helen F Heggestad
(74) *Attorney, Agent, or Firm* — Connolly Bove Lodge & Hutz LLP

(57) ABSTRACT

The present invention relates to a solid particle, and to a composition including a plurality of the solid particles, for reducing the sodium chloride content in food products. The solid particle(s) includes:

a) a fatty oil, wherein the fatty oil is suitable for consumption;

b) a solid core particle selected from potato powder; manioc powder; tapioca; cereal powder; dietary fiber; solid fats; solid waxes; crystalline sugar; and fruit powder; and c) a salt including sodium chloride.

The solid core particle is wholly or partly wetted with the fatty oil and the salt adheres to the surface of the solid core particle wetted with fatty oil.

16 Claims, No Drawings

COMPOSITION FOR REDUCING THE NACL CONTENT IN FOOD PRODUCTS

CROSS-REFERENCE TO RELATED APPLICATION

This application claims benefit of priority to U.S. Provisional Application No. 61/084,818, filed on Jul. 30, 2008, which is incorporated herein by reference in its entirety.

TECHNICAL FIELD

The present invention relates to a composition for reducing the sodium chloride content in food products, to processes for the preparation thereof and to uses.

BACKGROUND OF THE INVENTION

Excessive consumption of common salt (common salt and cooking salt consist substantially of sodium chloride), in particular in Western nutrition, contributes to an increased incidence of high blood pressure in the population. Elevated blood pressure can trigger or promote diseases, in particular cardiovascular diseases (cf. also N. Murray, Food Processing 2004 (May), pages 21-22).

On the other hand, the salty taste, which is caused in particular by common salt, is very important for the taste selection of food and luxury food products. In sensory tests, the saltier variant is frequently preferred. In addition, common salt serves as a masking agent for bitter taste impressions (Keast, Breslin and Beauchamp, Chimia 2001, 55 (Book 5), pages 441-447) and/or as a general flavor enhancer and is therefore used in a large number of primarily non-salty food and luxury food products.

It is known that a reduction in the amount of common salt in a food product often changes the overall sensory profile of this food product. In certain traditional food and luxury food products such as raw sausage or bread, the salt content can be significantly lowered without losing much of the flavor (for example Meat Science 2005, 70 (Book 3), pages 531-541). In other, less traditional applications such as ready-made soup or other ready meals and also snacks, lowering the salt content is, on the other hand, generally difficult, as the salt content was in many cases optimized in advance for the flavor of the finished products.

From the point of view of health, it is desirable to limit the daily intake of common salt and in particular of sodium ions. However, in this case, the flavor deficits caused by the reduction of common salt are to be substantially avoided to preserve the preference for the food and/or luxury food product.

There have already been described a plurality of substances as common salt-reducing agents (referred to hereinafter as "salt substitutes"), i.e. agents which allow the amount of common salt in food products to be reduced, without accordingly reducing the salty flavor of the food product. One of the oldest methods is the replacement of sodium chloride with potassium chloride.

In a relatively recent publication (U.S. Pat. No. 6,541,050), mixtures of various salts (potassium chloride and other sulfates and chlorides) are proposed to solve the problem.

WO 2007/045566 discloses as a salt substitute specific mixtures having a salty flavor, based on (a) one or more physiologically acceptable inorganic salts which are not sodium chloride and are preferably sodium-free, (b) one or more monovalent or polyvalent salts of polybasic food acids and (c) one or more amino acids suitable for nutrition or salts thereof.

U.S. Pat. No. 5,260,091 discloses the salt-enhancing effect of specific pyrazine derivatives, facilitating a reduction of the common salt content in edible preparations.

U.S. Pat. No. 5,094,862 describes a common salt-containing salt substitute in granular form. In said document there is first prepared a carbohydrate which is desweetened, preferably with lactisole, (for example desweetened crystalline sugar), which serves as the core material. In a fluidized bed, this desweetened core material is subsequently brought into contact with a coating solution containing common salt, for example in the form of a 20% by weight aqueous solution, and dried. In this way, according to U.S. Pat. No. 5,094,862, there is obtained a salty-tasting granular material which is sensorially similar to natural common salt. As the salty-tasting granular material according to U.S. Pat. No. 5,094,862 is prepared by means of a fluidized bed drying process, the procedure is comparatively long and cost-intensive. In addition, the step of desweetening the sweet core material used, which has to be carried out to prevent the salty taste from becoming impaired or dominated, in particular by remaining sweet aspects, is a further complex process step.

US 2008/0085360 proposes for salt reduction a powder mixture comprising substantially sodium chloride and a modified (for example citric acid) chloride salt which is not sodium chloride and is applied to an excipient (such as maltodextrin).

The primary object of the present invention is the provision of a salty-tasting composition as a salt substitute, which allows the amount of sodium chloride [to be reduced] with (approximately) the same salty taste and preferably without other significant losses of flavor, a reduction of the content of sodium chloride by up to 60% by weight being striven for. Furthermore, the process for preparing compositions of this type should be simple, short and economical.

SUMMARY OF THE INVENTION

The object of the present invention is achieved by the subject-matters according to the invention as claimed in the independent claims.

A first configuration according to the invention relates to a composition comprising or consisting of the following constituents:

a) one or more solid core particles suitable for consumption,
b) one or more fatty oils which are suitable for consumption and wholly or partly wet the core particle or particles and
c) salt which is suitable for consumption and comprises or consists of sodium chloride which adheres to the surface of the core particle or particles wetted with fatty oil.

A second configuration according to the invention relates to a process for preparing compositions according to the invention comprising or consisting of the following steps:

i) providing one or more core particles as constituent a), one or more fatty oils as constituent b) and salt which is suitable for consumption and comprises or consists of sodium chloride as constituent c)

and ii) placing and fluidizing the core particles according to constituent a) in a mixer,
iii) supplying the fatty oil or oils according to constituent b) into the mixer, so that the core particles are wholly or partly wetted and
iv) supplying the salt comprising or consisting of sodium chloride according to constituent c) into the mixer, so that the salt at least partly adheres to the surface of the core particles from step iii) wetted with fatty oil or v) placing and fluidizing the core particles according to constituent a) and the salt comprising or consisting of sodium chloride according to constituent c) in a mixer and vi) supplying the fatty oil or oils according to constituent b) into the mixer, so that the core particles are wholly or partly wetted and the salt at least partly adheres to the surface of the core particles wetted with fatty oil.

A third configuration according to the invention relates to a food product additionally comprising or consisting of compositions according to the invention.

A fourth configuration according to the invention relates to the use of compositions according to the invention for preparing food products.

A fifth configuration according to the invention relates to the use of compositions according to the invention for reducing sodium chloride content in food products.

Preferred configurations of the configurations according to the invention (subject-matters of the invention) are illustrated in the dependent claims and also the subsequent detailed description and may, if appropriate, be combined with one another.

DETAILED DESCRIPTION OF THE INVENTION

The present invention is based on the surprising finding that the compositions according to the invention can be used to greatly reduce the NaCl content in (preferably dry) food products (food products according to the invention), often by 20 to 70% by weight, the best results being achieved in the case of a reduction of the NaCl content in the range of from 30-60% by weight. Although it has not been possible to completely clarify the causes of this, the inventors assume that the fatty oil or oils suitable for consumption according to component b) of the compositions according to the invention have, in addition to the adhesion-promoting function, also flavor-enhancing properties having a positive effect on the reconstruction of the salty taste of the compositions according to the invention.

A further advantage is that the process according to the invention for preparing the compositions according to the invention is carried out by means of a dry mixing process having, in contrast to a fluidized bed drying process which is described in particular in U.S. Pat. No. 5,094,862, a shorter and more economical procedure. In addition, the core particles of the composition according to the invention do not, in contrast to the sweet core material from U.S. Pat. No. 5,094,862, have to be desweetened, before they are coated with the salts which are suitable for consumption and comprise or consist of sodium chloride and nevertheless the salty taste of the compositions according to the invention is not sensorially impaired by the core particles. The researchers assume that this surprising effect is based on the flavor-enhancing property of the fatty oil or oils suitable for consumption according to component b) of the compositions according to the invention.

In the sense of the present invention, the terms “solid” and “liquid” refer in this case respectively to the state of matter at 25° C. and 1,013 mbar.

In the sense of the present invention, the Dxx value specifies the particle diameter at which, based on volume, xx % by volume of the particles of a particle diameter have a smaller or equal diameter. The average particle diameter accordingly corresponds to a D50 value. Furthermore, a D90 value of 400 μm means for example that 90% by volume of the particles have a diameter of less than or equal to 400 μm.

Conventionally, common salt for snacks or French fries has a D90 value in the range of from 200-600 μm.

Percentages by weight (% by weight) in relation to the subject-matters according to the invention, i.e. the compositions or food products according to the invention, are based in each case on the total weight of the dry mass of the respective composition or the respective food product.

According to a preferred configuration of the first subject-matter of the invention, the composition according to the invention additionally comprises or consists of the following constituents:

d) one or more flow promoters and/or e) aroma.

In a further preferred configuration of the first subject-matter of the invention, the composition according to the invention is characterized in that 20 to 80% by weight, preferably 30 to 60% by weight of the core particle or particles to be used in accordance with the invention according to constituent a), and/or 0.2 to 10% by weight, preferably 5 to 8% by weight, particularly preferably 1 to 6% by weight of the fatty oil or oils to be used in accordance with the invention according to constituent b), and/or 10 to 75% by weight, preferably 30 to 60% by weight of the salt which is to be used in accordance with the invention, is suitable for consumption and comprises or consists of sodium chloride as constituent c), and/or 0 to 2% by weight, preferably 0.1 to 1% by weight, particularly preferably 0.2 to 0.7% by weight of the flow promoter or promoters to be used in accordance with the invention according to constituent d), and/or 0 to 10% by weight, preferably 0.05 to 8% by weight, particularly preferably 0.01 to 5% by weight of the aroma to be used in accordance with the invention according to constituent e), are present, in each case based on the dry mass of the composition according to the invention.

The particle size of the compositions according to the invention has preferably a D90 value in the range of from 500-100 μm, particularly preferably in the range of from 600-900 μm.

In a further preferred configuration of the first subject-matter of the invention, compositions according to the invention have “very good flow properties” or are at least “free flowing”.

The flowability of a bulk product according to the invention can be characterized by the angle of repose. At an angle of repose of less than 30° the flow properties are said to be “very good”; at an angle of repose in the range of from 30° to 45° flow is said to be “free”; and at an angle of repose of greater than 45° flow is said to be “poor”. It should be noted in this case that in the event of markedly agglutinated or baked forms no angle of repose at all may be determined, as in such cases there is no flowability. The angle of repose can be determined in accordance with DIN ISO 4324.

Constituents a) to e) and also preferred configurations thereof of the compositions according to the invention of the first subject-matter of the invention will be described hereinafter and may be combined with the above-described (preferred) configurations of the first subject-matter of the invention and also with one another, if appropriate, in any desired manner:

Constituent a)—Core Particles to be Used in Accordance with the Invention

The core particle to be used in accordance with the invention is selected from the group of solids suitable for consumption and is preferably selected from the group consisting of dried and ground food products, vegetable powder such as potato powder, manioc powder, tapioca, cereal powder, in particular of oats, wheat, maize and/or millet, dietary fiber (for example fruit or vegetable fibers), minerals, solid (crystalline) fats, solid (crystalline) waxes, crystalline sugar and/or fruit powders.

The solid core particle to be used in accordance with the invention is particularly preferably selected from the group consisting of potato powder, manioc powder, tapioca, cereal powder, in particular of oats, wheat, maize and/or millet.

Preferred size of the core particle to be used in accordance with the invention:

Preferably, the core particles to be used in accordance with the invention have a D50 value in the range of from 200-750 μm, more preferably in the range of from 250-550 μm, particularly preferably in the range of from 300-450 μm.

If core particles having a D50 value much lower than 200 μm are used, intensified agglutination of the core particle and common salt is observed. This is undesirable, as the resulting particles of the composition according to the invention are not free flowing and the salty taste is not satisfactory. Such core particles do not correspond to the size distribution according to the invention.

Particularly preferred in the size of the core particles to be used in accordance with the invention is in this case furthermore a (very) narrow distribution curve of the particle size of the core particles used, preferably such that 80% by volume or more of the core particles to be used in accordance with the invention have a particle size in the range of from 100 μm-1,000 μm, more preferably in the range of from 125 μm-800 μm.

The best results were achieved for core particles to be used in accordance with the invention having a D90 value of greater than or equal to 500 μm.

Constituent b)—Fatty Oil to be Used in Accordance with the Invention as a Coating Agent According to the invention, the "fatty oil" coating agent is selected from the group of the fatty oils suitable for consumption and serves to wet the core particle according to the invention to the extent that the salt which is suitable for consumption and comprises or consists of sodium chloride can adhere to the surface of the core particle without the occurrence of undesirable oiling.

The term "fatty oil" refers in the sense of the present invention to a triglyceride, in particular containing the same or different $C_4$ to $C_{18}$ fatty acid radicals.

According to the invention, suitable examples of fatty oils are preferably edible oils, more preferably vegetable oils. Suitable fatty oils are particularly preferably selected from the group consisting of borage oil, thistle oil, peanut oil, hazelnut oil, coconut oil, linseed oil, maize germ oil, macadamia nut oil, almond oil, olive oil, pecan nut oil, pistachio nut oil, rape oil, rice germ oil, sesame oil, soya oil, sunflower oil, walnut oil or wheat germ oil. Of these, peanut oil, coconut oil, sunflower oil and rape oil are most particularly preferred.

A further configuration preferred in accordance with the invention uses fractionated vegetable oils containing mainly $C_6$ to $C_{10}$ fatty acid radicals. Particularly suitable are the (substantially) flavor-neutral triglycerides which contain the same or different $C_6$ to $C_{10}$ fatty acid radicals (what are known as MCT oils, medium-chain triglycerides) which also have outstanding spreading and wetting properties.

Furthermore, the MCT oils have the advantage that they are not hygroscopic and do not lead to undesirable agglomeration of the particles according to the invention.

Constituent c)—Salt which is to be Used in Accordance with the Invention and Comprises or consists of sodium chloride The term "salt which is suitable for consumption and comprises or consists of sodium chloride" refers within the scope of the present invention preferably to common salt, i.e. cooking salt or table salt. Cooking salt or table salt is the salt used in cooking for human nutrition. It consists mainly (97% by weight or more) of sodium chloride with up to 3% by weight of impurities provided by other salts such as inter alia magnesium chloride and sulfates contained. To improve the properties, common salt can furthermore contain small amounts of other substances such as for example fluoride, iodide, flow auxiliaries, vitamins.

The common salt to be used in accordance with the invention may be of differing origin; thus, rock salt, boiled salt or sea salt can for example also be used. Common salt is commercially available in different grain sizes; if necessary, the particle size and preferred particle size distribution can be set by grinding and sieving.

Preferred size of the common salt to be used in accordance with the invention:

Preferably, the common salt to be used in accordance with the invention has a D90 value in the range of from 20-50 μm, preferably in the range of from 30-35 μm.

The common salt is applied to the surface of the excipient which is treated with liquid coating agent.

Optional Constituent d)—Flow Auxiliaries to be Used in Accordance with the Invention (Anticaking agent)

Optionally, the compositions according to the invention are mixed with a flow auxiliary. The term "a flow auxiliary" refers in the sense of the present invention to solid substances/compounds which are applied—sometimes in mixtures with other agents such as emulsifiers, antioxidants and preservatives—directly to the solid surface of products. Technologically, flow auxiliaries are examples of auxiliaries which, as well as improving or maintaining pourability, prevent food products from adhering or clinging to a mold, underlay, sheath or from sticking to one another. Examples of preferred flow auxiliaries within the scope of the present invention include magnesium oxide, Na, K or Ca compounds of edible fatty acids, magnesium stearate, silica (preferably precipitated silica or pyrogenic silicon dioxide), Ca silicates, tricalcium phosphate, carboxymethylcellulose and microfine vegetable fibers (preferably wheat or oat fibers).

A particularly preferred flow promoter to be used in accordance with the invention is (preferably pyrogenic) silicon dioxide having a specific surface area in the range of from 50 to 500 $m^2/g$, preferably in the range of from 100 to 400 $m^2/g$ (surface area calculated in accordance with BET, on the basis of DIN 66131).

Precipitated silicas to be used in accordance with the invention (total formula: $SiO_2$) can be prepared for example by means of precipitation processes or hydrothermal processes and are available inter alia from Degussa-Hüls AG (now EVONIC) under the commercial name Sipernat® or Carplex® in different qualities. Precipitated silicas have advantageously a specific surface area in the range of from 50 to 500 $m^2/g$ in accordance with BET and particle sizes in the range of from 3 to 100 μm. Precipitated silicas which are particularly preferably to be used are amorphous and have particle sizes in the range of from 3 to 50 μm.

Amorphous, highly disperse pyrogenic silicon dioxide, as the flow agent to be used in accordance with the invention, can be prepared for example by means of an oxyhydrogen flame or in an arc. Highly disperse hydrophobic or hydrophilic silicon dioxides are for example available from Degussa-Hüls AG under the commercial name Aersosil® in different qualities. The size of the spherical primary particles of the silicon dioxide is in this case usually in the range of from 7 to 40 nm.

These primary particles form agglomerates and aggregates (see DIN 53206) but do not have, unlike precipitated silicas, a defined agglomerate size. Preferably, the highly disperse silicon dioxide, as the flow agent to be used in accordance with the invention, has a specific surface area in the range of from 50 to 400 $m^2/g$, preferably in the range of from 100 to 300 $m^2/g$ in accordance with BET. The average size of the primary particles is preferably in the range of from 7 to 20 nm, preferably in the range of from 7 to 16 nm.

Further information concerning silicon dioxides which can be used within the scope of the invention can be inferred for example from EP 0 331 425 and the Sivento product brochure entitled “Aerosil®—Pyrogene Kieselsäuren” (“Aerosil®—Pyrogenic Silicas”) from Degussa-Hüls AG (now EVONIC).

Optional Constituent e)—Aroma to be Used in Accordance with the Invention

Generally speaking, the aroma to be used in accordance with the invention is in the form of mixtures of two or more aromatic substances and also optionally flavoring substances and if appropriate auxiliaries and excipients.

In preferred embodiments of the compositions according to the invention, the aroma (constituent e)) is used together with or as a further constituent of the fatty oil (constituent b)) to aromatize the compositions according to the invention. The aroma can in this case be solid or liquid; preferably, the aroma is liquid.

In preferred embodiments, the compositions according to the invention contain an aroma to round off and/or to refine the flavor and/or odor of the preparation. Suitable aromas are preferably selected from the group consisting of synthetic, natural or nature-identical aromatic, odorous and flavoring substances and mixtures thereof, essential oils, reaction aromas, smoke aromas or other aroma-imparting preparations. Furthermore, such aromas may preferably be protein [partial] hydrolysates, grill aromas, plant extracts, spices, spice preparations, vegetables and/or vegetable preparations which can furthermore contain suitable auxiliaries and excipients. Particularly suitable are aromas which are preferred in accordance with the invention or constituents thereof which cause a roasted, meaty (in particular chicken, fish, seafood, beef, pork, lamb, mutton, goat), vegetable-like (in particular tomato, onion, garlic, celery, leek, mushroom, eggplant, kelp), a spicy (in particular black and white pepper, chili, paprika, cardamom, nutmeg, allspice, mustard and mustard products), pan-fried, yeasty, boiled, fatty, salty and/or sharp aroma impression and can thus enhance a spicy and salty impression.

Essential oils, which according to the invention can be constituents of the aroma, are preferably selected from the group consisting of aniseed oil; valerian oil; basil oil; mugwort oil; bergamot oil; bitter almond oil; savory oil; buchu leaves oil; camphor oil; cananga oil; cardamom oil; cascarilla oil; cassia oil; citronella oil; lemon oil; coriander oil; cumin oil; dill weed oil; dill seed oil; tarragon oil; eucalyptus citriodora oil; eucalyptus oil; fennel oil; grapefruit oil; ginger oil; blue chamomile oil; Roman chamomile oil; spearmint oil; caraway oil; lemon grass oil; lovage oil; distilled lime oil; pressed lime oil; laurel leaf oil; mace oil; marjoram oil; mandarin oil; nutmeg oil; clove leaf oil; clove bud oil; orange oil; origanum oil; parsley leaf oil; parsley seed oil; peppermint oil; pepper oil; allspice oil; rosemary oil; Dalmatian sage oil; Spanish sage oil; celery seed oil; Japanese anise oil; thyme oil; vanilla extract; juniper berry oil; winter-green oil; cinnamon leaf oil; cinnamon bark oil and also fractions thereof.

The aroma to be used in accordance with the invention can in this regard in some cases (substantially) correspond sensorially to the food product to which the compositions according to the invention are later to be applied. Thus, for example, on application of compositions according to the invention to potato chips, use may preferably be made of a deep-fried potato aroma; on application to peanut puffs, use may preferably be made of a deep-fried maize aroma.

The amount of aroma to be used in accordance with the invention lies preferably in the range of from 0.001 to 10% by weight, preferably 0.005 to 8% by weight, more preferably 0.01 to 5% by weight, in each case based on the dry mass (i.e. anhydrous mass) of the composition according to the invention.

Within the scope of the present invention, individual aromatic substances which are preferably to be used are selected from the group consisting of:

acetaldehyde, acetylmethylcarbinol, acetophenone, allyl caproate, alpha ionone, beta ionone, anisaldehyde, anisyl acetate, anisyl formate, benzaldehyde, benzothiazole, benzyl acetate, benzyl acetate, benzyl alcohol, benzyl benzoate, beta ionone, butyl butyrate, butyl caproate, butylidene phthalide, capric acid, caproic acid, caprylic acid, carvone, camphene caryo-phyllene, cineol, cinnamyl acetate, citral, citronellol, citronellal, citronellyl acetate, cyclohexyl acetate, cymene, damascon, decalactone, diacetyl, dihydrocoumarin, dimethyl anthranilate, dimethyl anthranilate, dodecalactone, ethoxyethyl acetate, ethyl acetate, ethylbutyric acid, ethyl butyrate, ethyl caprinate, ethyl caproate, ethyl crotonate, ethyl formate, ethyl furaneol, ethyl guaiacol, ethyl isobutyrate, ethyl isovalerate, ethyl lactate, ethyl lactate, ethyl maltol, ethyl methyl butyrate, ethyl propionate, eucalyptol, eugenol, ethyl heptylate, 1-(4'-hydroxyphenyl)-2-butanone (Frambinon®), gamma-decalactone, geraniol, geranyl acetate, geranyl acetate, grapefruit aldehyde, methyl dihydrojasmonate (Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzyl acetone, isoamyl alcohol, isoamyl isovalerate, isobutyl butyrate, isobutyraldehyde, isoeugenol methyl ether, isopropyl methyl thiazole, lauric acid, levulinic acid, linalool, linalool oxide, Malyl acetate, maltol, l-menthol, menthofuran, methyl anthranilate, methyl butanol, methylbutyric acid, 2-methylbutyl acetate, methyl caproate, methyl cinnamate, 5-methyl furfural, 3,2,2-methyl cyclo-pentenolone, 6,5,2-methyl heptenone, methyl dihydrojasmonate, methyl jasmonate, 2-methyl methyl butyrate, 2-methyl-2-pentenoic acid, methylthiobutyrate, 3,1-methylthiohexanol, 3-methylthiohexyl acetate, nerol, neryl acetate, trans,trans,2,4-nonadienal, 2,4-nonadienol, 2,6-nonadienol, 2,4-nonadienol, nootkatone, delta octalactone, gamma octalactone, 2-octanol, 3-octanol, 1,3-octenol, 1-octyl acetate, 3-octyl acetate, palmitic acid, paraldehyde, phellandrene, pentanedione, phenyl ethyl acetate, phenyl ethyl alcohol, phenyl ethyl alcohol, phenyl ethyl isovalerate, piperonal, propionaldehyde, propyl butyrate, pulegone, pulegol, sinensal, sulfurol, terpinene, terpineol, terpinolene, 8,3-thiomenthone, 4,4,2-thiomethyl pentanone, thymol, delta-undecalactone, gamma-undecalactone, valencene, valeric acid, vanillin, acetoin, ethyl vanillin, ethyl vanillin isobutyrate (=3-ethoxy-4-isobutyryloxybenzaldehyde), Furaneol® (2,5-dimethyl-4-hydroxy-3(2H)-furanone) and derivatives thereof (in this case preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (in this case preferably ethyl maltol), coumarin and coumarin derivatives, gamma-lactones (in this case preferably gamma-undecalactone, gamma-nonalactone, gamma-decalalctone), delta-lactones (in this case preferably 4-methyl delta decalactone, massoia lactone, delta decalactone, tuberolactone), methyl sorbate, divanillin, 4-hydroxy-2(or 5)-ethyl-5(or 2)-methyl-3(2H)furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methylbutyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenyl glycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulfide, furfuryl mercaptan, methional, 2-acetyl-2-thiazoline, 3-mercapto-2-pentanone, 2,5-dimethyl-3-furanthiol, 2,4,5-trimethylthiazol, 2-acetylthiazol, 2,4-dimethyl-5-ethylthiazol, mercapto-3-methyl-1-butanol 2-acetyl-1-pyrroline, 2-methyl-3-ethyl pyrazine, 2-ethyl-3,5-dim ethyl pyrazine, 2-ethyl-3,6-dimethylpyrazine, 2,3-diethyl-5-methyl pyrazine, 3-isopropyl-2-methoxypyrazine, 3-isobutyl-2-methoxypyrazine, 2-acetylpyrazine, 2-pentyl pyridine, (E,E)-2,4-decadienal, (E,E)-2,4-nonadienal, (E)-2-octenal, (E)-2-nonenal, 2-undecenal, 12-methyltridecanal, 1-penten-3-one, 2,3-butanedione, 4-hydroxy-2,5-dimethyl-3(2H)-furanone, guaiacol, 3-hydroxy-4,5-dimethyl-2(5H)-furanone, 3-hydroxy-4-methyl-5-ethyl-2(5H)-furanone, dimethyl sulfide, trimethylamine, cinnamaldehyde, cinnamyl alcohol, methyl salicylate, isopulegol and also—where possible—cis/trans-isomers, stereoisomers, enantiomers, diastereomers and epimers thereof.

Preferably, the aromas to be used in accordance with the invention contain more than one of the aforementioned aromatic substances, preferably two, three, four, five, six, seven, eight, nine, ten or more of the aforementioned aromatic substances.

The second subject-matter of the invention relates to a process for preparing compositions according to the invention.

Accordingly, the preparation process according to the invention according to steps v) and vi) can be carried out in such a way that the core particles to be used in accordance with the invention and the salt which is suitable for consumption and comprises or consists of sodium chloride can be placed in a mixer to be used in accordance with the invention, preferably a fluidizing mixer, and subsequently mixed with the supplied fatty oil.

In an alternative configuration of the second subject-matter of the invention with steps ii) to iv), the core particles to be used in accordance with the invention are first placed in a mixer to be used in accordance with the invention, preferably a fluidizing mixer, subsequently the fatty oils are supplied, so that the core particles are wholly or partly wetted and subsequently the salt which is suitable for consumption and comprises or consists of sodium chloride is supplied into the mixer, so that the salt adheres at least partly to the surface of the core particles wetted with the fatty oil. As the best results with regard to the reduction of the NaCl content are achieved with this second alternative process, the second configuration is preferred.

Typical mixers to be used in accordance with the invention are for example ploughshare mixers (in particular those from the manufacturer Lödige) and multiflow fluid mixers (in particular those from the manufacturer Gericke). After the fluidizing of the core particles by the mixer, the (optionally aromatized) fatty oil is sprayed onto the core particles by means of a nozzle. Afterwards, the common salt is added to the (fluidized) mixture consisting of the core particle and fatty oil. This leads to the distribution and to the adhesion of common salt on and to the core particles.

According to a preferred configuration of the second subject-matter of the invention, the process according to the invention is characterized in that additionally one or more flow promoters, i.e. constituent d) and/or aroma, are provided as constituent e) and the aroma according to constituent e) is mixed with the fatty oil or oils according to constituent b), before the fatty oil according to step iii) or vi) is supplied to the mixer and/or the flow promoters according to constituent d) are mixed with the compositions obtained in step iv) or vi).

The preparation process according to the invention uses an unheated mixer at room temperature. Set in this case are preferably ambient temperatures of from 10° C. to 30° C., particularly preferably ambient temperatures of from 15° C. to 20° C.

The total mixing time for a preparation process according to the invention depends conventionally on the fluidization of components a) to c) and if appropriate further components d) and e) of the composition according to the invention, i.e. it is inter alia dependent on the mixers used and the composition of the raw materials used of the respectively foregoing components. In a preferred configuration of the preparation process according to the invention, the total mixing time is ≦10 minutes.

The third subject-matter of the invention relates to food products according to the invention. The preferred configurations of the food products to be used in accordance with the invention will be described hereinafter.

It has been found that the compositions according to the invention, in particular for example in spicy food products such as potato chips, peanut puffs, potato-based snacks or extrudates, French fries, crackers, popcorn, breadsticks, can imitate and/or enhance the salty taste, especially in this case the first impression (impact), but also in the further flavor course. The taste experience in relation to saltiness was sensorially felt to be pleasant for food products according to the invention and in many cases even preferable over the non-common salt-reduced food products.

In a further preferred configuration, the compositions according to the invention can advantageously be combined and mixed with spices, aromas and herbs. Compositions of this type according to the invention are also referred to as “spice mixtures”.

Obviously, the compositions according to the invention can also be mixed with variable amounts of common salt to be used in accordance with the invention or other salts, spices, herbs, dry aromas (for example spray-dried or granulated aromas) or else other sodium salts and be processed together therewith and applied to surfaces of food products.

It is preferable to apply the compositions according to the invention to solid food product surfaces having at least a relatively large surface area. Typically, these food products to be used in accordance with the invention have a length of at least 5 mm; usually, the length is in the range of from 10 to 200 mm.

Preferably, compositions according to the invention are applied to food products having a high carbohydrate content such as for example flour or starch products, in particular bakery products, deep-fried food products or dried extruded food products. Typically, the compositions according to the invention are applied to baked goods, long-life bakery products or snacks such as for example crackers, pretzel-like baked goods, cookies, potato or maize chips (for example tortilla chips), wheat flour products, (for example pastry sticks, croutons, bread chips, rusks, extruded and non-extruded crisp breads). Conventional shapes of the food products to be used in accordance with the invention are triangles, squares, rectangles, trapezoids, cones, cubes, cuboids, cylinders, spirals, rods, spheres, disks, strips, bars, circles, balls, ovals, dishes, pyramids, octahedrons, prisms or ellipses. However, the surfaces can also be present in any other shape. For snacks, animal shapes, such as crocodiles, fish or kangaroos, are for example also conceivable.

Preferably, the surface of a food product according to the invention, to or on which the compositions according to the invention are applied, has a low water content. Particularly preferably, the compositions according to the invention are applied to a dried, baked or deep-fried food product, the surface (for example crust) of which has a water content of less than or equal to 15% by weight, more preferably of less than or equal to 10% by weight.

Optional constituents of solid food products according to the invention, to the surface of which the compositions according to the invention are applied, may be conventional primary materials, additives and auxiliaries for edible, food or luxury food products, for example water, mixtures of fresh or processed, vegetable or animal primary or raw materials (for example raw, pan-fried, dried, fermented, smoked and/or boiled meat, bones, gristle, fish, vegetables, fruits, herbs, nuts, vegetable or fruit juices or pastes or mixtures thereof), digestible or non-digestible carbohydrates (for example sucrose, maltose, fructose, glucose, dextrin, amylose, amylopectin, inulin, xylan, cellulose, tagatose), sugar alcohols (for example sorbitol, erythritol), natural or hardened fats (for example tallow, lard, palm oil, coconut oil, hardened vegetable fat), oils (for example sunflower oil, peanut oil, maize germ oil, olive oil, fish oil, soya oil, sesame oil), fatty acids or salts thereof (for example potassium stearate), proteinogenic or non-proteinogenic amino acids and related compounds (for example γ-aminobutyric acid, taurine), peptides (for example glutathione), native or processed proteins (for example gelatin), enzymes (for example peptidases), nucleic acids, nucleotides, taste improvers for unpleasant taste impressions, taste-modulating substances (for example inositol phosphate, nucleotides such as guanosine monophosphate, adenosine monophosphate or other substances such as sodium glutamate or 2-phenoxypropionic acid), emulsifiers (for example lecithins, diacylglycerols, gum arabic), stabilizers (for example carrageenan, alginate), preservatives (for example benzoic acid, sorbic acid), antioxidants (for example tocopherol, ascorbic acid), chelators (for example citric acid), organic or inorganic acidifiers (for example acetic acid, phosphoric acid), additional bitter principles (for example quinine, caffeine, limonene, amarogentin, humulone, lupulone, catechin, tannin), substances preventing enzymatic browning (for example sulfite, ascorbic acid), essential oils, plant extracts, natural or synthetic dyes or coloring pigments (for example carotenoids, flavonoids, anthocyans, chlorophyll and derivatives thereof), spices, trigeminally active substances or plant extracts, containing trigeminally active substances of this type, synthetic, natural or nature-identical aromatic substances or odorous substances, odor or taste improvers and also modulating aromatic and/or flavoring substances.

Taste improvers and modulating aromatic and/or flavoring substances to be used in accordance with the invention are preferably selected from the group consisting of nucleotides, in particular adenosine-5'-monophosphate, cytidine-5'-monophosphate, inosine-5'-monophosphate, and pharmaceutically acceptable salts thereof; lactisoles; 2,4-dihydroxybenzoic acid; 3-hydroxybenzoic acid; sodium salts, preferably sodium chloride, sodium lactate, sodium citrate, sodium acetate, sodium gluconate; hydroxyflavanones, in particular those according to EP-A 1 258 200 (for example eriodictyol, homoeriodictyol or sodium salts thereof), hydroxybenzoic acid amides, preferably 2,4-dihydroxybenzoic acid vanillylamide, 2,4-dihydroxybenzoic acid-N-(4-hydroxy-3-methoxybenzyl)amide, 2,4,6-trihydroxybenzoic acid-N-(4-hydroxy-3-methoxybenzyl)amide, 2-hydroxybenzoic acid-N-4-(hydroxy-3-methoxybenzyl)amide, 4-hydroxybenzoic acid-N-(4-hydroxy-3-methoxybenzyl)amide, 2,4-dihydroxybenzoic acid-N-(4-hydroxy-3-methoxybenzyl)amide monosodium salt, 2,4-dihydroxybenzoic acid-N-2-(4-hydroxy-3-methoxyphenyl)ethylamide, 2,4-dihydroxybenzoic acid-N-(4-hydroxy-3-ethoxybenzyl)amide, 2,4-dihydroxybenzoic acid-N-(3,4-dihydroxybenzyl)amide and 2-hydroxy-5-methoxy-N-[2-(4-hydroxy-3-methoxyphenyl) ethyl]amide; 4-hydroxybenzoic acid vanillylamide (in particular those as described in WO 2006/024587 which, with regard to the corresponding compounds disclosed therein, is incorporated by reference into this application); mixtures of whey proteins with lecithins; hydroxydeoxybenzoins, such as for example 2-(4-hydroxy-3-methoxyphenyl)-1-(2,4,6-trihydroxyphenyl)ethanone, 1-(2,4-dihydroxyphenyl)-2-(4-hydroxy-3-methoxyphenyl)ethanone, 1-(2-hydroxy-4-methoxyphenyl)-2-(4-hydroxy-3-methoxyphenyl)ethanone) (in particular those as described in WO 2006/106023 which, with to regard to the corresponding compounds disclosed therein, is incorporated by reference into this application); hydroxyphenyl alkanediones, such as for example gingerdione-[2], gingerdione-[3], gingerdione-[4], dehydrogingerdione-[2], dehydrogingerdione-[3], dehydrogingerdione-[4]) (in particular those as described in WO 2007/003527 which, with regard to the corresponding compounds disclosed therein, is incorporated by reference into this application); diacetyl trimers (in particular those as described in WO 2006/058893 which, with regard to the corresponding compounds disclosed therein, is incorporated by reference into this application); γ-aminobutyric acids (in particular those as described in WO 2005/096841 which, with regard to the corresponding compounds disclosed therein, is incorporated by reference into this application) and divanillins (in particular divanillin as described in WO 2004/078302 which, with regard to the corresponding compounds disclosed therein, is incorporated by reference into this application); bicyclo[4.1.0]heptane-7-carboxylic acid amides, in particular those as described in WO 2008/046895 which, with regard to the corresponding compounds disclosed therein, is incorporated by reference into this application; cyclopropanecarboxylic acid(3-methylcyclohexyl)amides, in particular those as described in U.S. provisional 60/916,589 of May 8, 2007 and also the documents (Symrise) based thereon which, with regard to the corresponding compounds disclosed therein, are incorporated by reference into this application; aromatic neo-menthyl amides, in particular those as described in US provisional application 60/984,023 of Oct. 31, 2007 and also the documents (Symrise) based thereon which, with regard to the corresponding compounds disclosed therein, are incorporated by reference into this application; neo-menthyl derivatives, in particular those as described in U.S. provisional application 61/061,273 of Jun. 13, 2008 and also the documents (Symrise) based thereon which, with regard to the corresponding compounds disclosed therein, are incorporated by reference into this application.

In preferred embodiments, food products according to the invention, to the surface of which compositions according to the invention are applied, contain furthermore an aroma to be used in accordance with the invention, to round off and to refine the flavor and/or odor of the preparation.

The aroma which is to be used in accordance with the invention and is suitable for food products according to the invention has already been described, in particular with its preferred configurations, with regard to the first subject-matter of the invention, the compositions according to the invention.

The amount of aroma to be used in accordance with the invention for the food products according to the invention lies preferably in the range of from 0.0001 to 5% by weight, more preferably in the range of from 0.005 to 2% by weight, based on the food product according to the invention.

EXEMPLARY EMBODIMENTS

The present invention will be described hereinafter by way of exemplary embodiments, although these do not limit the scope of protection of the subject-matters according to the invention.

Unless otherwise specified, all particulars relate to weight.

The common salt (cooking salt) was sieved before each use.

Example 1

1,000 g of extra fine cooking salt [contains 1% by weight of silicon dioxide E551 and 8 mg of $K_4Fe(CN)_4$ E536; particle size D90: 32 μm. reference source: Akzo Nobel.]
40 g of sunflower oil
960 g of potato powder [particle size D50: 383 μm reference source: Unilever.]

960 g of potato powder are placed into a 5 liter Lödige ploughshare mixer, premixed for 10 seconds and fluidized. Without interrupting the mixing process, 40 g of sunflower oil (oil aerosol) are sprayed onto the fluidized potato powder by means of a one or two-fluid nozzle and subsequently remixed for 120 seconds. Without interrupting the mixing process, 1,000 g of extra fine cooking salt are subsequently added to the mixture and the entire mixture is mixed for a further 180 seconds.

Example 2

1,000 g of extra fine cooking salt [contains 1% by weight of silicon dioxide E551 and 8 mg of $K_4Fe(CN)_4$ E536; particle size D90: 34 μm. reference source: Akzo Nobel.]
28 g of sunflower oil (heated with potato powder and filtered)
968 g of potato powder [particle size D50: 329 μm reference source: KMC.]
4 g of Aerosil® [pyrogenic silica, specific surface area 200+/−5 $m^2$/g; reference source: Degussa.]

968 g of potato powder are placed into a 5 liter Lödige ploughshare mixer, premixed for 10 seconds and fluidized. Without interrupting the mixing process, 28 g of sunflower oil (oil aerosol) are sprayed onto the fluidized potato powder by means of a one or two-fluid nozzle and subsequently remixed for 180 seconds. Without interrupting the mixing process, 1,000 g of extra fine cooking salt are subsequently added to the mixture and the entire mixture is mixed for a further 180 seconds before finally 4 g of the flow auxiliary Aerosil® are added and remixed for 30 seconds.

Example 3

1,000 g of extra fine cooking salt [contains 1% by weight of silicon dioxide E551 and 8 mg of $K_4Fe(CN)_4$ E536; particle size D90: 34 μm. reference source: Akzo Nobel]
40 g of sunflower oil (heated with potato powder and filtered)
956 g of potato powder [particle size D50: 329 μm reference source: KMC]
8 g of Aerosil® [pyrogenic silica, specific surface area 200+/−5 $m^2$/g; reference source: Degussa]

968 g of potato powder are placed into a 5 liter Lödige ploughshare mixer, premixed for 10 seconds and fluidized. Without interrupting the mixing process, 40 g of sunflower oil (oil aerosol) are sprayed onto the fluidized potato powder by means of a one or two-fluid nozzle and subsequently remixed for 180 seconds. Without interrupting the mixing process, 1,000 g of extra fine cooking salt are subsequently added to the mixture and the entire mixture is mixed for a further 180 seconds before finally 8 g of the flow auxiliary Aerosil® are added and remixed for 30 seconds.

Example 4

1,000 g of extra fine cooking salt [contains 0.5% by weight of tricalcium phosphate and 8 mg of $K_4Fe(CN)_4$ E536; particle size D90: 31 μm. reference source: Akzo Nobel]
28 g of sunflower oil (with fried corn-type reaction aroma)
968 g of polenta [particle size D50: 368 μm reference source: Wesermühle]
4 g of Aerosil® [pyrogenic silica, specific surface area 200+/−5 $m^2$/g; reference source: Degussa]

The preparation was carried out as in Example 3.

Example 5

1,000 g of extra fine cooking salt [contains 0.5% by weight of tricalcium phosphate and 8 mg of $K_4Fe(CN)_4$ E536; particle size D90: 31 μm. reference source: Akzo Nobel]
30 g of rice germ oil (containing fried rice-type reaction aroma)
962 g of pregelatinized rice grains [particle size D50: 305 μm; reference source: Rickmers Reismühle]
8 g of wheat fiber [microfine wheat fiber, particle size D90: 30 μm; reference source: JRS]

The preparation was carried out as in Example 3, wherein the flow auxiliary Aerosil® was replaced with wheat fiber.

Example 6

1,000 g of extra fine cooking salt [contains 0.5% by weight of tricalcium phosphate and 8 mg of $K_4Fe(CN)_4$ E536; particle size D90: 31 μm. reference source: Akzo Nobel]
35 g of "bread crust"-type aromatized soya oil
957 g of instant wheat semolina [particle size D50: 319 μm; reference source: Wesermühle]
8 g of wheat fiber [microfine wheat fiber, particle size D90: 30 μm; reference source: JRS]

The preparation was carried out as in Example 3, wherein the flow auxiliary Aerosil® was replaced with wheat fiber.

Example 7

1,000 g of extra fine cooking salt [contains 1% by weight of silicon dioxide E551 and 8 mg of $K_4Fe(CN)_4$ E536; particle size D90: 34 μm. reference source: Akzo Nobel]
28 g of potato-type reaction aroma boiled in Myglyol (an MCT oil)

966 g of medium coarse potato powder [particle size D50: 467 µm; reference source: Unilever]

6 g of Aeromyl [physically modified potato starch, particle size Retsch test sieve in accordance with DIN 4188: at least 95%<1 mm; reference source: Südstärke]

The preparation was carried out as in Example 3, wherein the flow auxiliary Aerosil® was replaced with Aeromyl.

Application Example 1

Spice Mixture for 30% Salt-Reduced Potato Chips

| Constituent | Comparative spice mixture a | Comparative spice mixture b | Spice mixture A according to the invention |
|---|---|---|---|
| Sodium glutamate | 3.50 g | 3.50 g | 3.50 g |
| Cheese powder | 10.00 g | 10.00 g | 10.00 g |
| Garlic powder | 2.00 g | 2.00 g | 2.00 g |
| Whey powder | 38.86 g | 45.86 g | 38.86 g |
| Spice extract oil | 0.20 g | 0.20 g | 0.20 g |
| Paprika powder | 9.80 g | 9.80 g | 9.80 g |
| Common salt | 21.00 g | 14.00 g | 7.00 g |
| Tomato powder | 9.00 g | 9.00 g | 9.00 g |
| Dry aroma | 2.50 g | 2.50 g | 2.50 g |
| Silicon dioxide | 0.02 g | 0.02 g | 0.02 g |
| Vegetable oil | 0.02 g | 0.02 g | 0.02 g |
| Onion powder | 3.00 g | 3.00 g | 3.00 g |
| Cream aroma concentrate | 0.03 g | 0.03 g | 0.03 g |
| Cheese aroma | 0.03 g | 0.03 g | 0.03 g |
| Tomato aroma concentrate | 0.04 g | 0.04 g | 0.04 g |
| Composition according to the invention from Example 3 | | | 14.00 g |

6 g of the spice mixture were sprinkled onto 94 g of potato chips. The saltiness was evaluated in a sensory panel based on a saltiness intensity comparison.

| | Comparative spice mixture a | Comparative spice mixture b | Spice mixture A according to the invention |
|---|---|---|---|
| Saltiness (0-9) | 3.6 ± 0.6 | 2.3 ± 0.8 | 4.2 ± 0.6 |

Application Example 2

Spice Mixture for 50% Salt-Reduced Potato Chips

| Constituent | Comparative spice mixture a | Comparative spice mixture c | Spice mixture B according to the invention |
|---|---|---|---|
| Sodium glutamate | 3.50 g | 3.50 g | 3.50 g |
| Cheese powder | 10.00 g | 10.00 g | 10.00 g |
| Garlic powder | 2.00 g | 2.00 g | 2.00 g |
| Whey powder | 38.86 g | 50.36 g | 38.86 g |
| Spice extract oil | 0.20 g | 0.20 g | 0.20 g |
| Paprika powder | 9.80 g | 9.80 g | 9.80 g |
| Common salt | 21.00 g | 11.50 g | |
| Tomato powder | 9.00 g | 9.00 g | 9.00 g |
| Dry aroma | 2.50 g | 2.50 g | 2.50 g |
| Silicon dioxide | 0.02 g | 0.02 g | 0.02 g |
| Vegetable oil | 0.02 g | 0.02 g | 0.02 g |
| Onion powder | 3.00 g | 3.00 g | 3.00 g |
| Cream aroma concentrate | 0.03 g | 0.03 g | 0.03 g |
| Cheese aroma | 0.03 g | 0.03 g | 0.03 g |
| Tomato aroma concentrate | 0.04 g | 0.04 g | 0.04 g |
| Composition according to the invention from Example 2 | | | 21.00 g |

6 g of the spice mixture were sprinkled onto 94 g of potato chips. The saltiness was evaluated as in Application Example 1.

| | Comparative spice mixture a | Comparative spice mixture b | Spice mixture B according to the invention |
|---|---|---|---|
| Saltiness (0-9) | 3.6 ± 0.6 | 1.8 ± 0.8 | 3.8 ± 0.6 |

Application Example 3

Spice Mixture for 70% Salt-Reduced Potato Chips

| Constituent | Comparative spice mixture d | Comparative spice mixture e | Spice mixture C according to the invention |
|---|---|---|---|
| Sodium glutamate | 5.00 g | 5.00 g | 5.00 g |
| Maltodextrin | 18.70 g | 35.2 g | 28.7 g |
| Dextrose | 5.00 g | 5.00 g | 5.00 g |
| Onion powder | 1.00 g | 1.00 g | 1.00 g |
| Spice extract oil | 0.50 g | 0.50 g | 0.50 g |
| Paprika powder | 16.00 g | 16.00 g | 16.00 g |
| Common salt | 23.00 g | 6.50 g | |
| Dry aroma, bacon | 16.00 g | 16.00 g | 16.00 g |
| Dry aroma, onion | 0.30 g | 0.30 g | 0.30 g |
| Magnesium hydroxide carbonate | 0.50 g | 0.50 g | 0.50 g |
| Sugar | 11.00 g | 11.00 g | 11.00 g |
| Yeast extract | 3.00 g | 3.00 g | 3.00 g |
| Composition according to the invention from Example 3 | | | 13.00 g |

6 g of the spice mixture were sprinkled onto 94 g of potato chips. The saltiness was evaluated as in Application Example 1.

| | Comparative spice mixture d | Comparative spice mixture e | Spice mixture C according to the invention |
|---|---|---|---|
| Saltiness (0-9) | 3.6 ± 0.6 | 1.4 ± 0.8 | 3.4 ± 0.6 |

Application Example 4

Potato Chips, 30% Salt-Reduced

| Constituent | Comparative spice mixture f | Comparative spice mixture g | Food product D according to the invention |
|---|---|---|---|
| Common salt | 1.50 g | 1.00 g | |
| Potato chips | 98.50 g | 99.00 g | 98.00 g |
| Composition according to the invention from Example 2 | | | 2.00 g |

The salt or the substance mixture was sprinkled onto the potato chips. The saltiness was evaluated as in Application Example 1.

| | Comparative spice mixture f | Comparative spice mixture g | Spice mixture D according to the invention |
|---|---|---|---|
| Saltiness (0-9) | 4.2 ± 0.4 | 2.9 ± 0.8 | 4.3 ± 0.6 |

Application Example 5

Potato Chips, 50% Salt-Reduced

| Constituent | Comparative spice mixture f | Comparative spice mixture h | Food product E according to the invention |
|---|---|---|---|
| Common salt | 1.50 g | 0.75 g | |
| Potato chips | 98.50 g | 99.25 g | 98.50 g |
| Composition according to the invention from Example 2 | | | 1.50 g |

The salt or the substance mixture was sprinkled onto the potato chips. The saltiness was evaluated as in Application Example 1.

| | Comparative spice mixture f | Comparative spice mixture h | Spice mixture E according to the invention |
|---|---|---|---|
| Saltiness (0-9) | 4.2 ± 0.4 | 2.3 ± 0.7 | 3.9 ± 0.5 |

Application Example 6

Potato Chips, 66% Salt-Reduced

| Constituent | Comparative spice mixture f | Comparative spice mixture i | Food product F according to the invention |
|---|---|---|---|
| Common salt | 1.50 g | 0.50 g | |
| Potato chips | 98.50 g | 99.5 g | 99.00 g |
| Composition according to the invention from Example 2 | | | 1.00 g |

The salt or the substance mixture was sprinkled onto the potato chips. The saltiness was evaluated as in Application Example 1.

| | Comparative spice mixture f | Comparative spice mixture i | Spice mixture F according to the invention |
|---|---|---|---|
| Saltiness (0-9) | 4.2 ± 0.4 | 1.8 ± 0.7 | 3.5 ± 0.3 |

Application Example 7

French Fries, 50% Salt-Reduced

| Constituent | Comparative spice mixture j | Comparative spice mixture k | Food product G according to the invention |
|---|---|---|---|
| Common salt | 1.10 g | 0.55 g | |
| French fries, freshly deep-fried | 98.90 g | 99.45 g | 98.90 g |
| Composition according to the invention from Example 7 | | | 1.10 g |

The French fry blanks were deep-fried in accordance with the requirements. Then, they were weighed in and the common salt or substance mixture was sprinkled over the fries. Afterwards, they were tossed 3 to 5 times to distribute the salt or substance mixture homogeneously. The saltiness was evaluated in a consumer panel as in Application Example 1.

| | Comparative spice mixture j | Comparative spice mixture k | Spice mixture G according to the invention |
|---|---|---|---|
| Saltiness (0-9) | 3.8 ± 0.6 | 2.2 ± 0.7 | 3.7 ± 0.7 |

Application Example 8

Spice Mixture for Taco Chips, 50% Salt-Reduced

| Constituent | Comparative spice mixture l | Comparative spice mixture m | Spice mixture H according to the invention |
|---|---|---|---|
| Maltodextrin | 13.50 g | 24.50 g | 13.50 g |
| Salt | 22.00 g | 11.00 g | |
| Sodium glutamate | 6.00 g | 6.00 g | 6.00 g |
| Yeast extract | 4.00 g | 4.00 g | 4.00 g |
| Pepper, white | 0.02 g | 0.02 g | 0.02 g |
| Onion powder | 1.50 g | 1.50 g | 1.50 g |
| Chili con carne-type dry aroma | 30.00 g | 30.00 g | 30.00 g |
| Mexican-type dry aroma | 9.50 g | 9.50 g | 9.50 g |
| Sugar | 13.5 g | 13.5 g | 13.5 g |
| Composition according to the invention from Example 4 | | | 22.00 g |

8 g of the spice mixture were applied uniformly to 92 g of deep-fried taco chips. The evaluation was carried out based on Application Example 1.

| | Comparative spice mixture l | Comparative spice mixture m | Spice mixture H according to the invention |
|---|---|---|---|
| Saltiness (0-9) | 4.6 ± 1.3 | 2.8 ± 0.5 | 4.5 ± 0.7 |

Application Example 9

Wheat Cracker, Salt-Reduced

| Constituent | Comparative spice mixture n | Comparative spice mixture o | Food product I according to the invention |
|---|---|---|---|
| Common salt | 1.50 g | 0.75 g | |
| Sunflower oil | 10.0 g | 10.0 g | 10.0 g |
| Wheat cracker | 88.50 g | 89.25 g | 88.50 g |
| Composition according to the invention from Example 6 | | | 1.5 g |

The sunflower oil was heated and poured onto the wheat crackers while tumbling. Then, the common salt or the substance mixture according to Example VI was applied to the crackers. The evaluation was carried out as in Application Example 1.

| | Comparative spice mixture n | Comparative spice mixture o | Food product I according to the invention |
|---|---|---|---|
| Saltiness (0-9) | 3.5 ± 1.0 | 1.2 ± 0.3 | 3.4 ± 0.7 |

Application Example 10

Potato Chips with Roasted Ham Aroma, Salt-Reduced

The "roasted ham aroma" spice mixture contains 32% common salt and has a sodium content of 14% as a result of the presence of further sodium sources in the formulation. It is conventionally sprinkled at a metering rate of 6% onto potato chips in which, with a sodium content of 0.84%, it generates a very salty impression. In the present study the sodium content of the potato chip provided with roasted ham aroma is to be halved in that the sodium chloride was reduced.

The modified spice mixture was also sprinkled at a rate of 6% onto the potato chips and evaluated in an expert panel by means of descriptor analysis:

| | Roasted ham aroma on potato chips 0.84% sodium (not according to the invention) | Roasted ham aroma on potato chips 0.42% sodium (not according to the invention) | Roasted ham aroma on potato chips 0.42% sodium containing particles from Example 3 (according to the invention) |
|---|---|---|---|
| Smoky | 7 | 5 | 6.8 |
| Ham | 6 | 3.8 | 5.8 |
| Sweet | 3 | 2 | 2.8 |
| Salty | 7 | 4.1 | 7 |
| Umami | 6 | 4 | 5.5 |
| Onion | 4 | 3.8 | 4 |
| Saltiness | 7.2 ± 0.9 | 4.15 ± 0.6 | 7.1 ± 0.7 |

It was thus found that in the event of a reduction of salt in preparations not according to the invention, not only does the "salty" descriptor lose intensity, but all other taste descriptors also become less intense. For compositions and food products according to the invention, the present invention allowed all descriptors to be returned, even when the amount of sodium was halved, roughly back to the level of the full amount of sodium.

The saltiness was evaluated as in Application Example 1.

For the further descriptors too, the higher the numerical value, the more intensive the sensory perception of the descriptor.

Specific Embodiments

Specific embodiment one comprises a composition comprising or consisting of the following constituents:

a) one or more solid core particles suitable for consumption, b) one or more fatty oils which are suitable for consumption and wholly or partly wet the core particle or particles and c) salt which is suitable for consumption and comprises or consists of sodium chloride which adheres to the surface of the core particle or particles wetted with fatty oil.

Specific embodiment two comprises the composition as in specific embodiment one, additionally comprising or consisting of the following constituents:

d) one or more flow promoters and/or e) aroma.

Specific embodiment three comprises the composition as in specific embodiment one or two, wherein 20 to 80% by weight of the core particle or particles according to constituent a), and/or 0.2 to 10% by weight of the fatty oil or oils according to constituent b), and/or 10 to 75% by weight of the salt according to constituent c), and/or 0 to 2% by weight of the flow promoter or promoters according to constituent d), and/or 0 to 10% by weight of aroma according to constituent e), are present, in each case based on the dry mass of the composition.

Specific embodiment four comprises the composition as in any one of specific embodiments one to three, wherein the core particle or particles according to constituent a) are selected from the group consisting of dried and ground food products; vegetable powder such as potato powder; manioc powder; tapioca; cereal powder, in particular of oats, wheat, maize and/or millet; dietary fiber; minerals; solid (crystalline) fats; solid (crystalline) waxes; crystalline sugar and/or fruit powder.

Specific embodiment five comprises the composition as in any one of specific embodiments one to four, wherein the core particle or particles of constituent a) have a particle diameter having a D50 value in the range of from 200 to 750 μm. Specific embodiment six comprises the composition as claimed in any one of specific embodiments one to five, wherein the fatty oil or oils according to constituent b) are selected from triglycerides containing the same or different $C_4$ to $C_{18}$ fatty acid radicals.

Specific embodiment seven comprises the composition as in any one of specific embodiments one to six, wherein the salt according to constituent c) comprises up to 97% by weight or more of sodium chloride, based on the dry mass of the salt.

Specific embodiment eight comprises the composition as in any one of specific embodiments one to seven, wherein the salt according to constituent c) has a particle diameter having a D90 value in the range of from 20 to 50 μm.

Specific embodiment nine comprises the composition as in any one of specific embodiments one to eight, wherein the flow promoter or promoters according to constituent d) are selected from magnesium oxide, Na, K and/or Ca compounds of edible fatty acids, magnesium stearate, silicas, calcium silicates, tricalcium phosphate, carboxymethylcelluloses and/or microfine vegetable fibers.

Specific embodiment ten comprises the composition as in any one of specific embodiments one to nine, wherein the aroma according to constituent e) is selected from synthetic, natural or nature-identical aromatic, odorous and/or flavoring substances and also mixtures thereof, essential oils, reaction aromas, smoke aromas and/or other aroma-imparting preparations.

Specific embodiment eleven comprises a process for preparing compositions as in any one of specific embodiments one to ten comprising or consisting of the following steps:

i) providing one or more core particles as constituent a), one or more fatty oils as constituent b) and salt which is suitable for consumption and comprises or consists of sodium chloride as constituent c)

and ii) placing and fluidizing the core particles according to constituent a) in a mixer, iii) supplying the fatty oil or oils according to constituent b) into the mixer, so that the core particles are wholly or partly wetted and iv) supplying the salt according to constituent c) into the mixer, so that the salt adheres at least partly to the surface of the core particles from step iii) wetted with fatty oil or v) placing and fluidizing the core particles according to constituent a) and the salt according to constituent c) in a mixer and vi) supplying the fatty oil or oils according to constituent b) into the mixer, so that the core particles are wholly or partly wetted and the salt adheres at least partly to the surface of the core particles wetted with fatty oil.

Specific embodiment twelve comprises the process as in specific embodiment eleven, wherein to there are additionally provided one or more flow promoters as constituent d) and/or aromas as constituent e) and the aroma according to constituent e) is mixed with the fatty oil or oils according to constituent b), before the fatty oil according to step iii) or vi) is supplied to the mixer and/or the flow promoters according to constituent d) are mixed with the compositions obtained in step iv) or vi).

Specific embodiment thirteen comprises a food product additionally comprising or consisting of compositions as in any one of specific embodiments one to ten.

Specific embodiment fourteen comprises a use of compositions as in any one of specific embodiments one to ten for preparing food products.

Specific embodiment fifteen comprises a use of compositions as in any one of specific embodiments one to ten for reducing a sodium chloride content in food products.

The invention claimed is:

1. A solid particle suitable for consumption comprising:

a) a fatty oil, wherein the fatty oil is suitable for consumption;

b) a solid core particle, wherein the solid core particle is selected from the group consisting of potato powder; manioc powder; tapioca; cereal powder; dietary fiber; solid fats; solid waxes; crystalline sugar; and fruit powder, and wherein the solid core particle is wholly or partly wetted with the fatty oil; and c) a salt comprising sodium chloride, wherein the salt is suitable for consumption and adheres to the surface of the solid core particle wetted with fatty oil.

2. The solid particle as claimed in claim 1, wherein the fatty oil is selected from triglycerides having the same or different $C_4$ to $C_{18}$ fatty acid radicals.

3. The solid particle as claimed in claim 1, wherein the salt comprises 97% by weight or more of sodium chloride, based on the dry mass of the salt.

4. The solid particle as claimed in claim 1, wherein the salt has a particle diameter having a D90 value in the range of from 20 to 50 μm.

5. A process for preparing the solid particle as claimed in claim 1 comprising:

i) providing a plurality of solid core particles, a fatty oil and salt as claimed in claim 1;

ii) placing and fluidizing the solid core particles in a mixer, iii) supplying the mixer with the fatty oil so that the solid core particles are wholly or partly wetted; and iv) supplying the mixer with the salt so that the salt adheres, at least partly, to the surface of the solid core particles from step iii)

or v) placing and fluidizing a plurality of solid core particles and the salt according to claim 1 in a mixer; and vi) supplying the mixer with the fatty oil according to claim 1 so that the solid core particles are wholly or partly wetted and the salt adheres, at least partly, to the surface of the solid core particles wetted with fatty oil.

6. The process as claimed in claim 5, further comprising mixing the fatty oil with an aroma before the fatty oil is supplied to the mixer in step iii) or vi); and/or mixing the solid particles obtained in step iv) or vi) with a flow promoter.

7. A food product comprising a solid particle as claimed in claim 1.

8. A method of reducing sodium content in a food product, comprising adding the solid particle as claimed in claim 1, to the food product.

9. A method of reducing sodium chloride content in a food product, comprising substituting sodium chloride in the food product with the solid particle as claimed in claim 1.

10. The solid particle as claimed in claim 1, wherein the cereal powder is selected from the group consisting of oats, wheat, maize, and millet.

11. A composition comprising a plurality of solid particles according to claim 1.

12. The composition as claimed in claim 11, further comprising d) a flow promoter; and/or e) an aroma.

13. The composition as claimed in claim 12, wherein the composition comprises:

20 to 80% by weight of the solid core particles;

0.2 to 10% by weight of the fatty oil; and 10 to 75% by weight of the salt; and/or 0 to 2% by weight of the flow promoter; and/or 0 to 10% by weight aroma, wherein the % by weight, in each case, is based on the dry mass of the composition.

14. The composition as claimed in claim 12, wherein the composition comprises a flow promoter and the flow promoter is selected from the group consisting of magnesium oxide, Na, K or Ca compounds of edible fatty acids, magnesium stearate, silicas, calcium silicates, tricalcium phosphate, carboxymethylcelluloses and microfine vegetable fibers.

15. The composition as claimed in claim 12, wherein the composition comprises an aroma and the aroma is selected from the group consisting of synthetic, natural or nature-identical aromatic, odorous and/or flavoring substances or mixtures thereof, essential oils, reaction aromas, and smoke aromas.

16. The composition as claimed in claim 11, wherein the solid core particles have a particle diameter having a D50 value in the range of from 200 to 750 μm.

* * * * *